United States Patent
Granström et al.

(10) Patent No.: US 9,723,344 B1
(45) Date of Patent: Aug. 1, 2017

(54) EARLY DETECTION OF POLICY VIOLATING MEDIA

(71) Applicant: Google Inc., Mountain View, CA (US)

(72) Inventors: Johan Georg Granström, Zurich (CH); Thomas Weich, Zurich (CH); Vladimir Rychev, Zurich (CH)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/983,187

(22) Filed: Dec. 29, 2015

(51) Int. Cl.
| | |
|---|---|
| *H04N 21/254* | (2011.01) |
| *H04L 12/813* | (2013.01) |
| *H04N 7/173* | (2011.01) |
| *H04N 21/234* | (2011.01) |
| *H04N 21/239* | (2011.01) |
| *H04N 21/442* | (2011.01) |
| *H04N 21/4788* | (2011.01) |
| *H04N 21/8549* | (2011.01) |

(52) U.S. Cl.
CPC ......... *H04N 21/2541* (2013.01); *H04L 47/20* (2013.01); *H04N 7/17318* (2013.01); *H04N 21/2396* (2013.01); *H04N 21/23418* (2013.01); *H04N 21/44213* (2013.01); *H04N 21/4788* (2013.01); *H04N 21/8549* (2013.01)

(58) Field of Classification Search
CPC .......... H04N 21/2541; H04N 7/17318; H04N 21/23418; H04N 21/2396; H04N 21/44213; H04N 21/4788; H04N 21/8549; H04L 47/20
See application file for complete search history.

(56) References Cited

U.S. PATENT DOCUMENTS

| | | | |
|---|---|---|---|
| 8,094,872 B1* | 1/2012 | Yagnik | G06K 9/00711 380/201 |
| 8,195,038 B2 | 6/2012 | Liu et al. | |
| 8,229,219 B1 | 7/2012 | Ioffe | |
| 8,238,669 B2* | 8/2012 | Covell | G06K 9/00758 382/181 |
| 8,347,408 B2 | 1/2013 | Rodriguez et al. | |

(Continued)

OTHER PUBLICATIONS

Rosebrock, A., "Fingerprinting Images for Near-Duplicate Detection," Real Python., Dec. 18, 2014, 14 Pages, can be retrieved at <URL:https://realpython.com/blog/python/fingerprinting-images-for-nearduplicate-detection/?>.

(Continued)

*Primary Examiner* — Benjamin R Bruckart
*Assistant Examiner* — Susan X Li
(74) *Attorney, Agent, or Firm* — Young Basile Hanlon & MacFarlane, P.C.

(57) ABSTRACT

A media sharing system identifies fingerprints that represent an uploaded video and generates a digest based on the fingerprints. The media sharing system searches for digests of previously processed videos whose digests match the digest of the uploaded video. A previously processed video whose digest matches the digest of the uploaded video is identified as a matching video. For each matching video, the media sharing system retrieves policy information that describes whether the video was found to violate one or more policies of the media sharing system. The media sharing system determines whether to halt processing of the uploaded video based on the retrieved policy information.

20 Claims, 4 Drawing Sheets

(56) References Cited

U.S. PATENT DOCUMENTS

| | | | |
|---|---|---|---|
| 8,358,837 B2 | 1/2013 | Shakya et al. | |
| 8,611,422 B1 * | 12/2013 | Yagnik | G06F 17/30784 |
| | | | 375/240.01 |
| 8,838,609 B1 | 9/2014 | Sharifi et al. | |
| 8,947,595 B1 | 2/2015 | Tucker et al. | |
| 8,953,811 B1 | 2/2015 | Sharifi et al. | |
| 8,953,836 B1 | 2/2015 | Postelnicu et al. | |
| 9,113,203 B2 | 8/2015 | Pora et al. | |
| 9,275,427 B1 | 3/2016 | Sharifi | |
| 2005/0044561 A1 | 2/2005 | McDonald | |
| 2008/0109369 A1 * | 5/2008 | Su | G06Q 10/06 |
| | | | 705/59 |
| 2009/0037967 A1 | 2/2009 | Barkan et al. | |
| 2009/0037975 A1 * | 2/2009 | Ishikawa | G06F 21/105 |
| | | | 726/1 |
| 2009/0074235 A1 | 3/2009 | Lahr et al. | |
| 2009/0328237 A1 * | 12/2009 | Rodriguez | G06F 17/30781 |
| | | | 726/32 |
| 2010/0262488 A1 * | 10/2010 | Harrison | G06Q 30/02 |
| | | | 705/14.46 |
| 2012/0095958 A1 | 4/2012 | Pereira et al. | |
| 2014/0259097 A1 * | 9/2014 | Brock | G06F 17/30864 |
| | | | 726/1 |
| 2015/0019578 A1 | 1/2015 | Granstrom | |

OTHER PUBLICATIONS

U.S. Appl. No. 14/160,723, filed Jan. 22, 2014, entitled, "Classification of Media in a Media Sharing System," (copy not enclosed; not yet published).

United States Patent and Trademark Office, Non-final Rejection, U.S. Appl. No. 14/154,953, Mar. 24, 2016, 13 pages (copy not enclosed; not yet published).

* cited by examiner

EARLY DETECTION OF POLICY VIOLATING MEDIA

BACKGROUND

Field of the Embodiments

Described embodiments pertain in general to media sharing, and in particular to the early detection of uploaded media that violates system policies.

Description of the Related Art

Media sharing systems allow users to access media uploaded by other users. In order for a media sharing system to make uploaded media accessible to users, multiple processes have to be performed on the media. For example, the media may need to be classified into categories, transcoded into various formats and resolutions, and analyzed for inappropriate content. Based on the processing of the uploaded media, a determination may be made that the media cannot be hosted by the media sharing system because it violates system policies (e.g., includes inappropriate content). Hence, system resources were used on media that ultimately could not be hosted by the media sharing system. When a media sharing system is receiving millions of uploads a day, it is important to minimize the amount of resources that are spent on media that cannot be hosted by the system.

SUMMARY

The embodiments described herein provide methods, computer program products, and systems for determining early on whether to halt processing of an uploaded video based on previously uploaded videos. A user uploads a video to a media sharing system so that other users of the system can have access to the video. In order for the media sharing system to be able to make the video available to users, the media sharing system executes various ingest processes on the uploaded video. For example, the ingest processes may include generating one or more fingerprints for the video, transcoding the video into various formats and resolutions, classifying the video into one or more categories (e.g., sports, comedy, automotive, etc.), generating a thumbnail representation of the video, and analyzing the content of the video for inappropriate content.

One of the ingest processes that is executed early on determines whether processing of the uploaded video should be halted based on videos previously uploaded and processed by media sharing system. To make the determination, the media sharing system identifies fingerprints that represent the uploaded video. In one embodiment, the fingerprints are generated by one of the other ingest processes. The media sharing system generates a digest for the uploaded video by applying a digest function to the fingerprints of the uploaded video. The digest function collapses the fingerprints into a fixed size digest.

The media sharing system searches for digests of previously processed videos whose digests match the digest of the uploaded video. A previously processed video whose digest matches the digest of the uploaded video is identified as a matching video. For each matching video, the media sharing system retrieves policy information that describes whether the video was found to violate one or more policies of the media sharing system. For example, the policy information for a matching video may indicate that the video was not hosted by media sharing system because it included inappropriate content, such as sexual content, unauthorized copyright work, or spam.

The media sharing system determines whether to halt processing of the uploaded video based on the retrieved policy information. For example, if a majority of the matching videos were rejected by the media sharing system for violating system policies, the media sharing system may determine to halt processing of the uploaded video. When the media sharing system determines to halt processing of the uploaded video, the media sharing system stops the processing of the video and sends a message to the client device that provided the video. The message indicates that the video cannot be hosted by the media sharing system.

Hence, based on the previously uploaded videos, the media sharing system can determine whether the video will violate system policies before too many resources are expended on the video. For example, the media sharing system may determine to halt processing before ingest processes are executed or completed to classify the video into categories and analyze the video content for inappropriate content.

The features and advantages described in this summary and the following detailed description are not all-inclusive. Many additional features and advantages will be apparent to one of ordinary skill in the art in view of the drawings, specification, and claims hereof.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
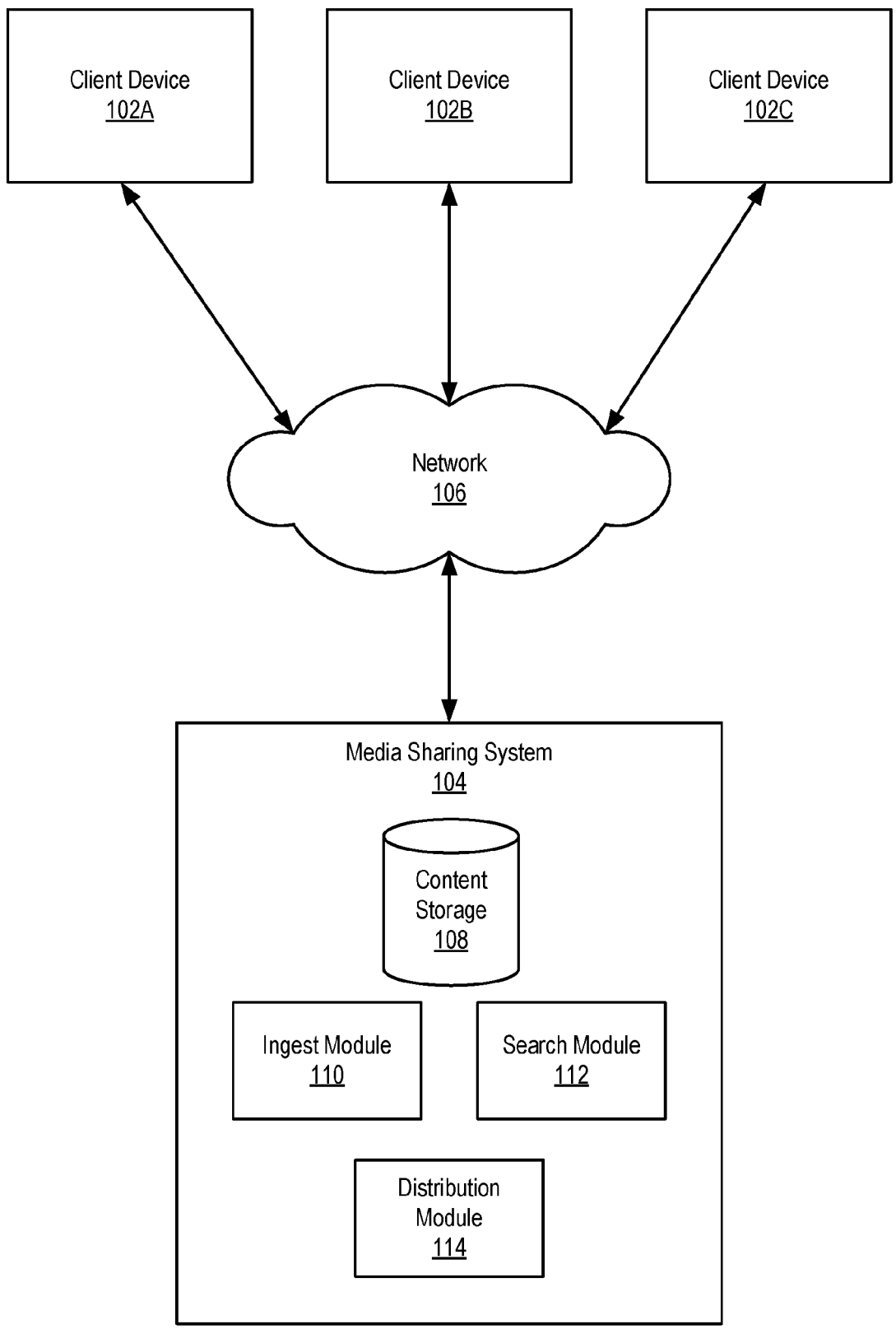
FIG. 1 is a block diagram of a media sharing environment according to one embodiment.

FIG. 1 is a block diagram of a media sharing environment 100 according to one embodiment. FIG. 1 illustrates client devices 102A, 102B, and 102C and a media sharing system 104 connected via a network 106. Although a select number of each entity are shown in FIG. 1, embodiments can have more or less of each entity (e.g., additional client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

A client device 102 is a device used by a user to communicate with the media sharing system 104. A client device 102 may be, for example, a personal computer, smart phone, tablet computer, personal digital assistant (PDA), or a set-top box. Through a client device 102, a user may upload a media item to the media sharing system 104.

Uploaded media that satisfies policies of the media sharing system 104 is hosted by the system 104 and made available to users for access.

Through a client device 102, a user may also request to access a media item hosted by the media sharing system 104. In one embodiment, a requested media item is streamed by the media sharing system 104 to the to the client device 102 and presented by the client device 102 to the user through a media player.

The media sharing system 104 is a computer system that hosts media provided by users and shares the media with users. The media hosted and shared by the media sharing system 104 will be described herein as being videos. However, it should be understood that the media sharing system 104 can host many other types of media, such as audio files, documents, animations, still images, etc.

The media sharing system 104 includes a content storage 108, an ingest module 110, a search module 112, and a distribution module 114. The content storage 108 stores videos accessible by users of the media sharing system 104. Along with each video, the content storage 108 stores metadata associated with the video, such as a title, a description of the video, tags/search terms associated with the video, an identifier assigned to the video, and one or more categories associated with the video. In one embodiment, the content storage 108 includes multiple versions of each video. Each version of a video varies in format, bitrate, and/or resolution.

The ingest module 110 processes videos uploaded by users. In order to make an uploaded video available to users for access, the ingest module 110 performs various ingest processes on the video. In one embodiment, the ingest module 110 is a directed acyclic graph (DAG) comprised of multiple nodes where each node performs one or more ingest processes.

The ingest processes performed by the ingest module 110 may include, for example, determining fingerprints for the video, transcoding the video, classifying the video, determining whether the video includes unauthorized copyrighted material, and generating a thumbnail for the video. Some of the ingest processes may occur in parallel.

One of the ingest processes performed by the ingest module 110 early on as other ingest processes are performed, determines whether processing of an uploaded video should be halted based on other videos previously uploaded. Based on one or more fingerprints generated for the uploaded video, the ingest module 110 determines whether the uploaded video includes the same or similar content to other videos previously uploaded and processed by the media sharing system 104.

If the uploaded video includes the same or similar content as some previously processed videos, the ingest module 110 retrieves policy information associated with those previously processed videos. The policy information indicates whether the previously processed videos violated policies of the media sharing system 104. Based on the information, the ingest module 110 determines whether to halt processing of the uploaded video and reject the video. For example, the ingest module 110 may determine to halt processing of the uploaded video if it includes the same content as another video that was not hosted by the media sharing system 104 for including inappropriate content.

If the ingest module 110 determines to halt processing of the uploaded video, the ingest module 110 stops the ingest processes being performed on the video and notifies the uploading user that the video cannot be hosted by the media sharing system 104. On the other hand, if the ingest module 110 determines not to halt processing of the uploaded video, the ingest processes continue to execute for the video. The ingest module 110 stores the uploaded video in the content storage 108 as long as no problems were found with the video during processing. In one embodiment, the ingest module 110 assigns an identifier to the uploaded video and stores the identifier in the content storage 108 along with other metadata associated with the video.

Hence, the ingest module 110 will interrupt the processing of the uploaded video if it determines based on previously processed videos that the video cannot be hosted by the media sharing system 104. Using previously processed videos allows for a determination that a video cannot be hosted before specific ingest processes are executed to independently evaluate the video for its appropriateness. For example, if an uploaded video includes the same content as another video that was previously found to include unauthorized copyright protected work, the ingest module 110 will stop processing of the video before an ingest process executes to analyze the video for copyrighted work. By making the determination as to whether to halt processing of an uploaded video early on, the media sharing system 104 minimizes the amount of resources spent on uploaded videos that cannot be hosted by the media sharing system 104.

The search module 112 processes queries received from client devices 102 for videos hosted by the media sharing system 104. A query received from a client device 102 includes one or more search terms. When a query is received from a client device 102, the search module 112 searches the content storage 108 for stored videos associated with the search terms of the query. The search module 112 generates search results that identify videos from the content storage 108 associated with one or more search terms of the query. The search module 112 transmits the search results to the client device 102 that provided the query.

The distribution module 114 processes requests for videos from client devices 102. When the distribution module 114 receives a request for a video from a client device 102, the distribution module 114 identifies in the request an identifier associated with the video. The distribution module 114 identifies the video in the content storage 108 based on the identifier and streams the video to the client device 102.

In an embodiment where the content storage 108 includes multiple versions of each video, the distribution module 114 selects a version of the video to stream to the client device 102. The distribution module 114 selects the version of the video based on at least one of: the type of the client device 102 (e.g., mobile device or personal computer), the capabilities of the client device 102 (e.g., formats supported by the device 102), network conditions (e.g., available bandwidth), and user preferences (e.g., user preference for content in a specific resolution).

The network 106 represents the communication pathways between the client devices 102 and the media sharing system 104. In one embodiment, the network 106 is the Internet and uses standard communications technologies and/or protocols. Thus, the network 106 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the user datagram protocol (UDP), the hypertext transport protocol (HTTP), the simple mail transfer protocol (SMTP), the file transfer protocol (FTP), etc.

The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
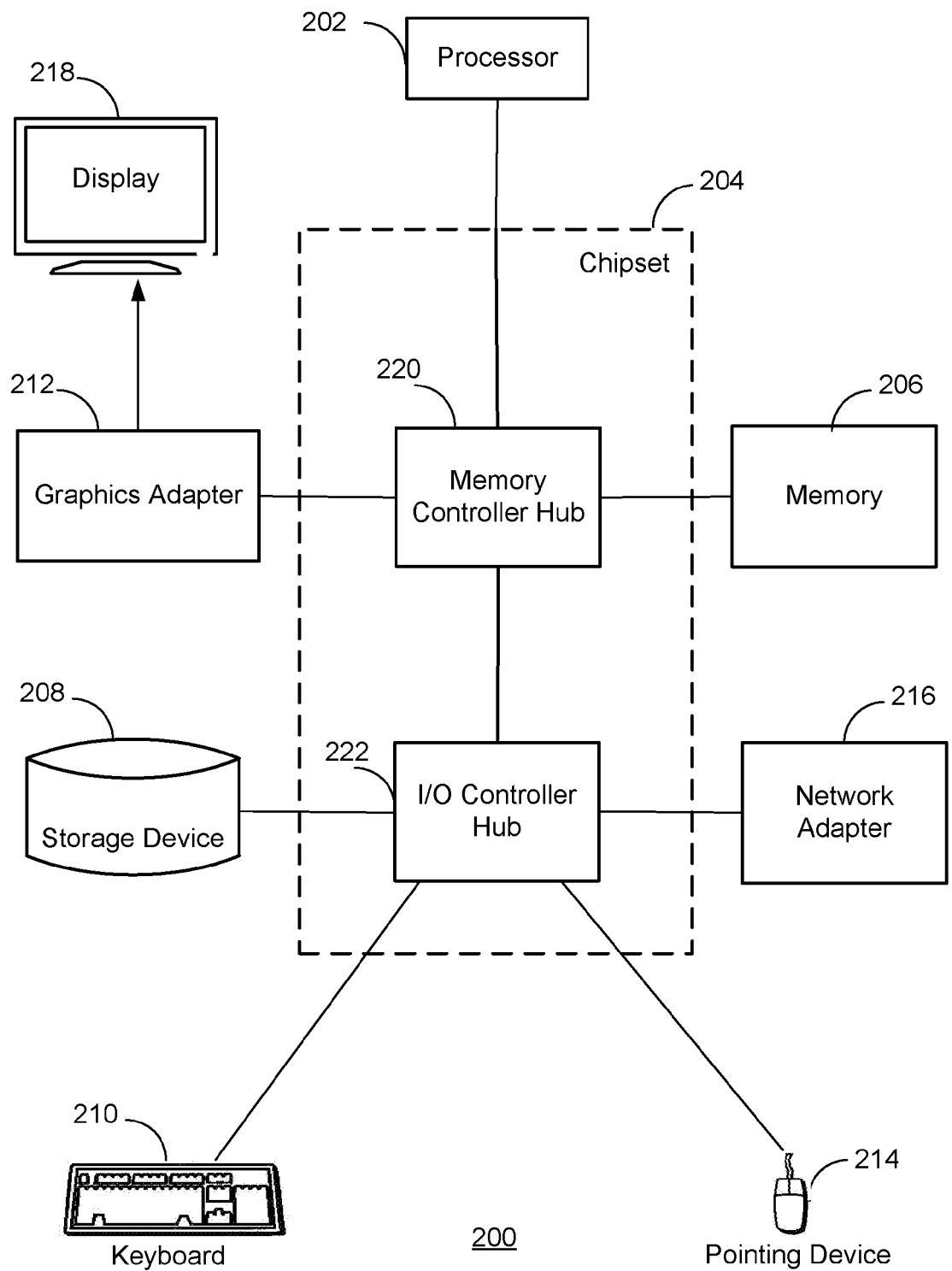
FIG. 2 is a block diagram illustrating a functional view of a typical computer system for use as one of the entities illustrated in the environment of FIG. 1 according to an embodiment.

FIG. 2 is a high-level block diagram illustrating a functional view of a typical computer system for use as one of the entities illustrated in the environment 100 of FIG. 1 according to an embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 106.

As is known in the art, a computer 200 can have different and/or other components than those shown in FIG. 2. In addition, the computer 200 can lack certain illustrated components. For example, a computer system 200 acting as a media sharing system 104 may lack a keyboard 210 and a pointing device 214. Moreover, the storage device 208 can be local and/or remote from the computer 200 (such as embodied within a storage area network (SAN)).

The computer 200 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 208, loaded into the memory 206, and executed by the processor 202.

The types of computer systems 200 used by the entities of FIG. 1 can vary depending upon the embodiment and the processing power used by the entity. For example, a user device 102 may be a mobile phone with limited processing power, a small display 218, and may lack a pointing device 214. The media sharing system 104, in contrast, may comprise multiple blade servers working together to provide the functionality described herein.

Figure 3:
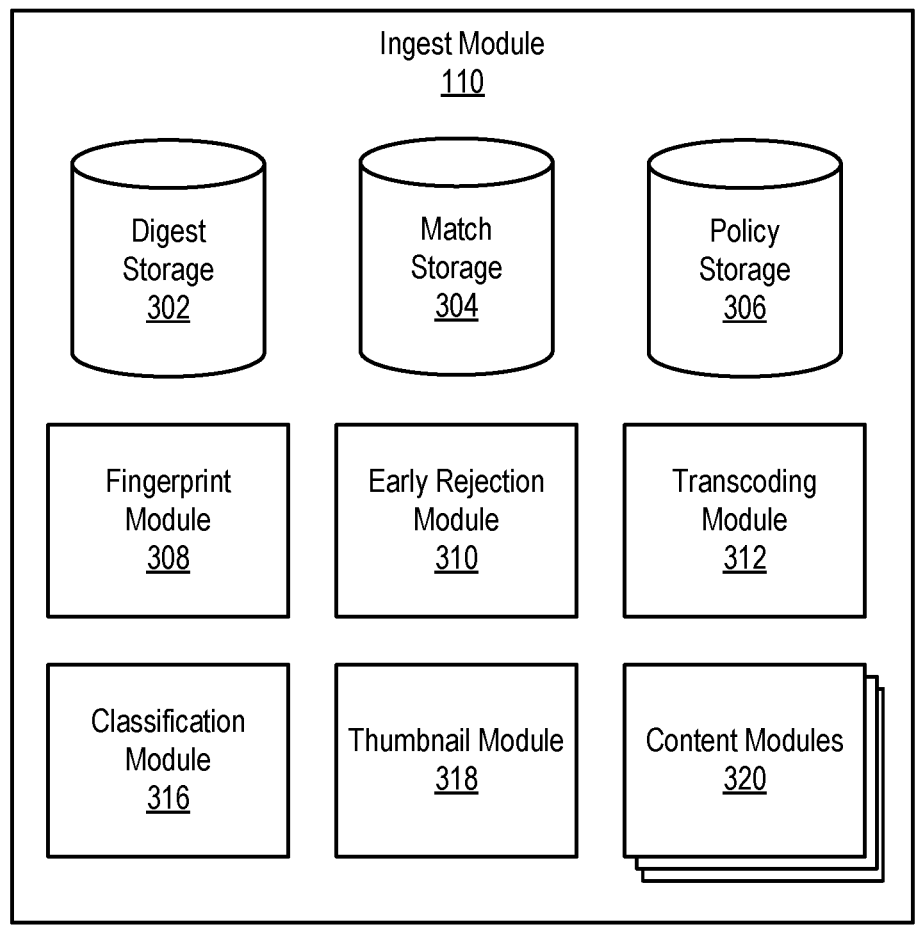
FIG. 3 is a block diagram illustrating modules operating within an ingest module according to one embodiment.

FIG. 3 is a block diagram illustrating modules and storages of the ingest module 110 according to one embodiment. The ingest module 110 includes a digest storage 302, a match storage 304, a policy storage 306, a fingerprint module 308, an early rejection module 310, a transcoding module 312, a classification module 316, a thumbnail module 318, and content modules 320. Those of skill in the art will recognize that other embodiments of the ingest module 110 can have different and/or other components than the ones described here, and that functionalities can be distributed among modules in a different manner.

In one embodiment, each module of the ingest module 110 is a vertex in a DAG, where the vertices of the DAG are connected by edges. When a video is uploaded to the media sharing system 104, the vertices of the DAG execute ingest processes on the video in order to make the video available to users via the media sharing system 104.

The digest storage 302 stores digests generated for videos previously uploaded and processed by the media sharing system 104. Each digest stored by digest storage 302 is associated with a previously processed video from which the digest was generated. In one embodiment, a digest is generated by applying a digest function to fingerprints of the associated video.

The match storage 304 identifies previously processed videos that included the same content. For a set of processed videos that were found to include the same content, the match storage 304 stores information indicating that the videos include the same content. For example, if videos A, B, C, and D were found to include the same content, the match storage 304 would store information indicating that videos A, B, C, and D include the same content. In one embodiment, for two videos to be considered to include the same content, 100% of the content must be the same between both videos. In another embodiment, for two videos to be considered to include the same content, the videos must have at least a certain percentage of content in common (e.g., at least 90% of the content).

The policy storage 306 stores information regarding previously processed videos. For a previously processed video, the policy storage 306 stores information indicating whether the video was found to violate one or more policies of the media sharing system 104. In one embodiment, if a previously processed video was found to violate a system policy, the policy storage 306 stores information describing the policy that the video violated. For example, the policy storage 306 may store information describing that a previously processed video violated a system policy by including sexual content, unauthorized copyright protected work, violent content, hateful content, the same content as another video, or spam. For a previously processed video, the policy storage 306 may also store information describing whether the video is currently active (e.g., currently available for users to access), whether the video was rejected for violating one or more system policies, and whether the video has been reported by one or more users for including inappropriate content.

The fingerprint module 308 generates fingerprints for uploaded videos that represent the videos. When a video is uploaded to the media sharing system 104 by a client device 102, the fingerprint module 308 generates fingerprints for the video based on features of the video. In one embodiment, the fingerprint module 308 generates fingerprints for the video based the locations of discontinuities in the frame sequence of the video. A discontinuity can be, for example, a shot boundary, a scene change, a period of audio silence, a cut, a fade, etc. The fingerprint module 308 analyzes the video for discontinuities and generates a bit vector indicating the locations of discontinuities in the video frame sequence. The bit vector is segmented into fingerprints which represent the video. Further details on the generation of fingerprints based on discontinuities are provided by U.S.

Pat. No. 8,611,422, which issued on Dec. 17, 2013 and which is incorporated by reference herein in its entirety.

The early rejection module 310 determines whether the ingest module 110 should halt processing of an uploaded video based on videos previously processed by the media sharing system 104. For an uploaded video, the early rejection module 310 identifies the fingerprints generated by the fingerprint module 308 for the uploaded video. The early rejection module 310 generates a digest for the uploaded video by applying a digest function to the fingerprints of the uploaded video. The digest function collapses the fingerprints into a fixed size digest. The digest function may be, for example, locality sensitive hashing (LSH), such as MinHash or SimHash.

By collapsing the fingerprints into a fixed size digest it allows the early rejection module 310 to quickly identify previously processed videos that are nearly similar to the uploaded video. Using fingerprints to search for previously processed videos is more expensive in terms of resources and slower than using digests. However, in other embodiments, fingerprints may be used to search for previously processed videos.

The early rejection module 310 searches the digest storage 302 for digests of previously processed videos that match the digest generated for the uploaded video. If there are no digests in the digest storage 302 that match the digest of the uploaded video, the early rejection module 310 determines that processing of the video can continue. Since there are no digests in the digest storage 302 that match the digest of the uploaded video, it means that media sharing system 104 has not processed other videos with the same content as the uploaded videos. Hence, the early rejection module 310 has not data for determining whether to cut short the processing of the uploaded video. As a result, the early rejection module 310 allows processing of the video to continue.

On the other hand, if the early rejection module 310 identifies one or more digests of previously processed videos that match the digest of the uploaded video, the early rejection module 310 determines whether to halt processing of the uploaded video based on the previously processed videos. For each matching digest identified in the digest storage 302, the early rejection module 310 determines the previously processed video associated with the digest. The early rejection module 310 identifies the previously processed video as a matching video of the uploaded video.

For each matching video, the early rejection module 310 searches the match storage 304 to determine whether other previously processed videos include the same content as the matching video. If the match storage 304 indicates that another previously processed video includes the same content as the matching video, the early rejection module 310 also identifies the previously processed video as a matching video.

For example, assume that based on searching the digest storage 302, the early rejection module 310 identifies video A as matching video of the uploaded video. The early rejection module 310 then searches the match storage 304 for information associated with video A. If the match storage 304 indicates that video A includes the same content as video E, the early rejection module 310 also identifies video E as a video that matches the uploaded video. Hence, the early rejection module 310 determines that videos A and E are matching videos of the uploaded video.

Searching the match storage 304 allows the early rejection module 310 to identify certain matching videos that were not identified during the search of the digest storage 302. For example, continuing with the example from above, during the search of the digest storage 302 the early rejection module 310 may not identify video E as a matching video because its respective digest is different than the digest of the uploaded video. The differences between the digests may be because of variations between the content of the two videos (e.g., one video may not include some scenes included in the other video). However, an administrator of the media sharing system 104 may have determined that videos A and E actually include the same content and updated the match storage 304 to reflect that videos A and E include the same content. Hence, if videos A is a matching video of the uploaded video, video E should also be a matching video.

For each matching video identified for the uploaded video, the early rejection module 310 retrieves from the policy storage 306 policy information associated with the matching video. The early rejection module 310 determines whether to halt processing and reject the uploaded video based on the retrieved policy information. In one embodiment, based on retrieved policy information the early rejection module 310 determines how many of the matching videos were rejected and not hosted for violating one or more policies of the media sharing system 104. The early rejection module 310 also determines how many of the matching videos were not rejected for violating system policies. If the number of matching videos rejected is greater than the number of matching videos not rejected by a threshold amount (e.g., 100% greater), the early rejection module 310 determines to halt processing of the uploaded video. On the other hand, if the number of matching videos rejected is not greater than the number of matching videos not rejected by the threshold amount, the early rejection module 310 allows processing of the uploaded video to continue.

In another embodiment, the early rejection module 310 determines whether to halt processing of the uploaded video based on policy scores calculated for the matching videos. The early rejection module 310 calculates a policy score for each matching video based on its respective policy information. A matching video's policy score indicates the degree to which the matching video violated system policies. In one embodiment, for each policy of the media sharing system 104 that the matching video violated, the policy score is incremented by a certain amount. The amount that the policy score is incremented is dependent on the violated policy. In one embodiment, a system administrator sets for difference policies the values for incrementing a policy score. For example, a system administrator may set that the policy score be incremented by X points if the matching video included sexual content and incremented by Y points if the matching video included violent content.

The early rejection module 310 combines (e.g., sums) the policy scores calculated for the matching videos to obtain a processing score. If the processing score is greater than a threshold, the early rejection module 310 determines to halt processing of the uploaded video. However, if the processing score is below the threshold, the early rejection module 310 allows processing of the uploaded video to continue.

When the early rejection module 310 determines to halt processing of the uploaded video, the early rejection module 310 halts any ingest processes being performed on the upload video by other modules of the ingest module 110. Additionally, the ingest module 110 does not allow any additional ingest processes to be started for the uploaded video. The early rejection module 310 also transmits a message to the client device 102 that provided the uploaded video. The message indicates that the uploaded video cannot be hosted by the media sharing system 104.

In one embodiment, one or more modules of the ingest module 110 wait for the early rejection module 310 to determine that processing of the uploaded video can continue before executing their respective ingest processes. In this embodiment, when the early rejection module 310 determines that processing of the uploaded video can continue, the early rejection module 310 allows the one or more modules to execute.

The early rejection module 310 stores the digest generated for the uploaded video in the digest storage 302 along with an indication that the digest is associated with the uploaded video. The early rejection module 310 also updates the match storage 304 to indicate that the uploaded video includes the same content as each of its matching videos. Additionally, the early rejection module 310 stores information in the policy storage 306 describing the result of its analysis. If the early rejection module 310 halted processing of the uploaded video, the early rejection module 310 stores information in the policy storage 306 indicating that the uploaded video was rejected for violating one or more system policies. However, if the early rejection module 310 determined to allow processing of the uploaded video to continue, the early rejection module 310 stores information in the policy storage 306 indicating that processing for the uploaded video was not halted based on previously processed videos.

The transcoding module 312 transcodes uploaded videos. For an uploaded video, the transcoding module 312 transcodes the uploaded video to generate multiple versions of the video. Each version of the video may vary, for example, in format, bitrate, and resolution. For example, for a specific operating system, the transcoding module 312 may transcode the video to generate multiple versions of the video in a format compatible with the operating system, each version having a different resolution (e.g., 144p, 240p, 360p, 480p, and 720p). For another operating system, the transcoding module 312 may generate another set of videos with the different resolutions but in a different format compatible with the other operating system. The transcoding module 312 stores the different versions of the uploaded video in the content storage 108.

In one embodiment, the transcoding module 312 assigns an identifier to the uploaded video (e.g., a numeric identifier) and the identifier is associated with each version of the video stored in the content storage 108. In one embodiment, when a video is uploaded to the media sharing system 104, the transcoding module 312 transcodes the video into a format that allows the modules of the ingest module 110 to process the video.

The classification module 316 classifies uploaded videos. The classification module 316 classifies an uploaded video into one or more categories. For example, the categories may include comedy, music, gaming, beauty, fashion, automotive, animation, sports, etc. In one embodiment, for each of the different categories, the classification module 316 analyzes the content of the uploaded video for characteristics associated with category. If the classification module 316 determines that the uploaded video includes characteristics associated with a category, the classification module 316 classifies the uploaded video under the category.

In one embodiment, the classification module 316 classifies the uploaded video based on information provided by a user that uploaded the video. For example, the classification module 316 may determine categories in which to classify the video based on the title, tags, and description provided by the user for the video. The classification module 316 stores information in the content storage 108 in association with uploaded video indicating the categories into which the video has been classified.

The thumbnail module 318 selects representative video frames for uploaded videos. For an uploaded video, the thumbnail module 318 assists in selecting a video frame from the video that is used as a snapshot of the video. The selected frame (also referred to as a thumbnail) is presented to users in pages to represent the video. For example, if the uploaded video is a search result for a search query, the selected frame would be included in the search results page along with information associated with the video (e.g., the title).

In one embodiment, the thumbnail module 318 selects three video frames from the uploaded video. The first frame is one quarter into the video, the second frame is half way into video, and the third frame is three quarters into the video. For example, if the video is sixty seconds long, the thumbnail module 318 selects the first video frame at the fifteen second mark, the second video frame at the thirty second mark, and the third video frame at the forty five second mark. The thumbnail module 318 provides the three selected frames to the client device 102 that uploaded the video to the media sharing system 104 and the user of the client device 102 can select one of the three video frames to represent the video. The thumbnail module 318 stores the frame selected by the user in the content storage 108 in association with the uploaded video.

The content modules 320 analyze the content of uploaded videos for inappropriate content that violates policies of the media sharing system 104. Each content module 320 analyzes the content of an uploaded video for a specific type of inappropriate content. The types of content that the uploaded video is analyzed for may include sexual content, violent content, hateful content, unauthorized copyright protected work, the same content as another video, and spam.

In one embodiment, if a content module 320 determines that the uploaded video includes content that violates a system policy, the content module 320 rejects the uploaded video and sends a message to the client device 102 that provided the video. The message indicates that the video cannot be hosted by media sharing system 104 and provides reasoning as to why the video cannot be hosted (e.g., indicates the policy violated by the video). The content module 320 stores information in the policy storage 306 indicating that the uploaded video was rejected and indicating the policies violated by the video.

Hence, even if the early rejection module 310 does not reject the uploaded video based on previously processed videos, one or more content modules 320 may later reject the video based on an analysis of its content. However, it is preferable that the early rejection module 310 reject the uploaded video rather than a content module 320 so that system resources do not have to be used in analyzing the video for different types of unauthorized content.

Figure 4:
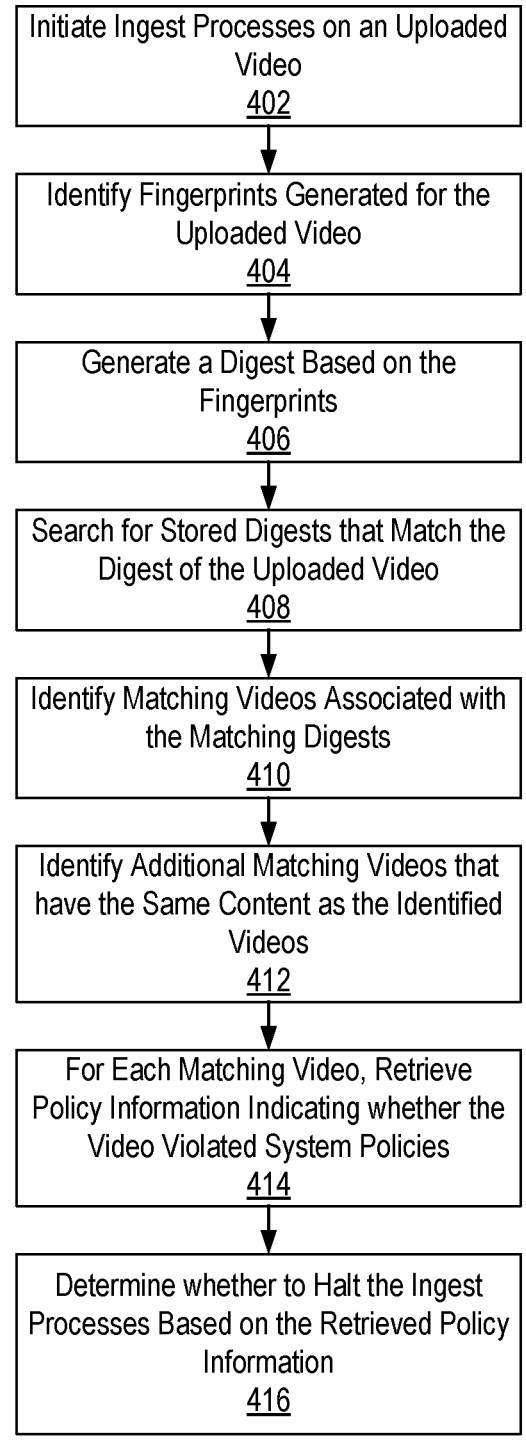
FIG. 4 is a flow chart illustrating operations of the media sharing system in determining whether to halt processing of an uploaded video according to one embodiment.

FIG. 4 is a flow chart illustrating operations of the media sharing system 104 in determining whether to halt processing of an uploaded video according to one embodiment. Those of skill in the art will recognize that other embodiments can perform the steps of FIG. 4 in different orders. Moreover, other embodiments can include different and/or additional steps than the ones described herein.

Assume for purposes of this example that a video has been uploaded to the media sharing system 104 by a client device 102. The media sharing system 104 initiates 402 ingest processes on the uploaded video. The ingest processes are performed in order to be able to make the video available for users to access. As the ingest processes are executing, the media sharing system 104 determines based on previously processed videos whether to halt processing and reject the uploaded video. To make the determination, the media sharing system 104 identifies 404 fingerprints generated for the uploaded video. In one embodiment, the fingerprints are generated by one of the ingest processes.

The media sharing system 104 generates 406 a digest based on the fingerprints of the uploaded video. The media sharing system 104 searches 408 for stored digests that match the digest of the uploaded video. The stored digests are associated with videos that were previously uploaded and processed by the media sharing system 104. The media sharing system 104 identifies 410 as matching videos, the videos whose digest matches the digest of the uploaded video. The media sharing system 104 also identifies 412 other previously processed videos that had the same content as the matching videos. The other videos are also identified as matching videos.

The media sharing system 104 retrieves 414, for each matching video, policy information indicating whether the video violated one or more policies of the media sharing system 104. The media sharing system 104 determines 416 whether to halt the ingest processes and processing of the video altogether based on the retrieved policy information.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A computer-implemented method comprising:
receiving, by a media sharing system from a client device, a video;
initiating, by the media sharing system, a plurality of ingest processes on the received video to make the received video available to users of the media sharing system;
identifying, by the media sharing system, one or more fingerprints representing the received video;
generating, by the media sharing system, a digest based on the one or more fingerprints;
identifying, by the media sharing system, a first previously uploaded video associated with a digest that matches the generated digest;
identifying, by the media sharing system, a second previously uploaded video that includes same content as the first previously uploaded video;
retrieving, by the media sharing system, first policy information indicating whether the first previously uploaded video violated one or more policies of the media sharing system;

retrieving, by the media sharing system, second policy information indicating whether the second previously uploaded video violated one or more policies of the media sharing system; and determining, by the media sharing system, to halt the plurality of ingest processes based on the first and second policy information.

2. The method of claim 1, wherein an additional digest associated with the second previously uploaded video does not match the generated digest.

3. The method of claim 1, wherein determining to halt the plurality of ingest processes comprises:

determining based on the first and second policy information a first number of videos including same content as the received video rejected by the media sharing system and a second number of videos including same content as the received video not rejected by the media sharing system; and responsive to the first number being greater than the second number by a threshold amount, determining to halt the plurality of ingest processes.

4. The method of claim 1, wherein determining to halt the plurality of ingest processes comprises:

calculating a first policy score for the first previously uploaded video based on the first policy information, the first policy score indicating a degree to which the first previously uploaded video violated policies of the media sharing system;

calculating a second policy score for the second previously uploaded video based on the second policy information, the second policy score indicating a degree to which the second previously uploaded video violated policies of the media sharing system;

determining a processing score based on the first and second policy scores; and responsive to the processing score being greater than a threshold, determining to halt the plurality of ingest processes.

5. The method of claim 1, further comprising responsive to determining to halt the plurality of ingest processes:

stopping the plurality of ingest processes; and transmitting a message to the client device indicating that the received video cannot be hosted by the media sharing system.

6. The method of claim 1, wherein generating the digest comprises:

collapsing the one or more fingerprints into a fixed size digest based on a digest function.

7. The method of claim 1, wherein the second previously uploaded video is identified based on information stored by the media sharing system that indicates that the second previously uploaded video includes the same content as the first previously uploaded video.

8. A computer-implemented method comprising:

receiving, by a media sharing system from a client device, a media item;

initiating, by the media sharing system, a plurality of ingest processes on the received media item to make the received media item available to users of the media sharing system;

identifying, by the media sharing system, one or more fingerprints representing the received media item;

generating, by the media sharing system, a digest based on the one or more fingerprints;

identifying, by the media sharing system, a first previously uploaded media item associated with a digest that matches the generated digest;

identifying, by the media sharing system, a second previously uploaded media item that includes same content as the first previously uploaded media item;

retrieving, by the media sharing system, first policy information indicating whether the first previously uploaded media item violated one or more policies of the media sharing system;

retrieving, by the media sharing system, second policy information indicating whether the second previously uploaded media item violated one or more policies of the media sharing system; and determining, by the media sharing system, to halt the plurality of ingest processes based on the first and second policy information.

9. The method of claim 8, wherein the first policy information indicates whether a determination was made that the received media item could not be hosted by the media sharing system.

10. The method of claim 8, wherein an additional digest associated with the second previously uploaded media item does not match the generated digest.

11. The method of claim 8, further comprising responsive to determining to halt the plurality of ingest processes:

stopping the plurality of ingest processes; and transmitting a message to the client device indicating that the received media item cannot be hosted by the media sharing system.

12. The method of claim 8, wherein determining to halt the plurality of ingest processes comprises:

determining based on the first and second policy information a first number of media items including same content as the received media item rejected by the media sharing system and a second number of media items including same content as the received media item not rejected by the media sharing system; and responsive to the first number being greater than the second number by a threshold amount, determining to halt the plurality of ingest processes.

13. The method of claim 8, wherein determining to halt the plurality of ingest processes comprises:

calculating a first policy score for the first previously uploaded media item based on the first policy information, the first policy score indicating a degree to which the first previously uploaded media item violated policies of the media sharing system;

calculating a second policy score for the second previously uploaded media item based on the second policy information, the second policy score indicating a degree to which the second previously uploaded media item violated policies of the media sharing system;

determining a processing score based on the first and second policy scores; and responsive to the processing score being greater than a threshold, determining to halt the plurality of ingest processes.

14. The method of claim 8, wherein generating the digest comprises:

collapsing the one or more fingerprints into a fixed size digest based on a digest function.

15. A computer program product comprising a non-transitory computer-readable storage medium containing computer program code for:

receiving, by a media sharing system from a client device, a media item;

initiating, by the media sharing system, a plurality of ingest processes on the received media item to make the received media item available to users of the media sharing system;

identifying, by the media sharing system, one or more fingerprints representing the received media item;

generating, by the media sharing system, a digest based on the one or more fingerprints;

identifying, by the media sharing system, a first previously uploaded media item associated with a digest that matches the generated digest;

identifying, by the media sharing system, a second previously uploaded media item that includes same content as the first previously uploaded media item;

retrieving, by the media sharing system, first policy information indicating whether the first previously uploaded media item violated one or more policies of the media sharing system;

retrieving, by the media sharing system, second policy information indicating whether the second previously uploaded media item violated one or more policies of the media sharing system; and determining, by the media sharing system, to halt the plurality of ingest processes based on the first and second policy information.

16. The computer program product of claim 15, wherein the first policy information indicates whether a determination was made that the received media item could not be hosted by the media sharing system.

17. The computer program product of claim 15, wherein an additional digest associated with the second previously uploaded media item does not match the generated digest.

18. The computer program product of claim 15, wherein determining to halt the plurality of ingest processes comprises:

determining based on the first and second policy information a first number of media items including same content as the received media item rejected by the media sharing system and a second number of media items including same content as the received media item not rejected by the media sharing system; and responsive to the first number being greater than the second number by a threshold amount, determining to halt the plurality of ingest processes.

19. The computer program product of claim 15, wherein determining to halt the plurality of ingest processes comprises:

calculating a first policy score for the first previously uploaded media item based on the first policy information, the first policy score indicating a degree to which the first previously uploaded media item violated policies of the media sharing system;

calculating a second policy score for the second previously uploaded media item based on the second policy information, the second policy score indicating a degree to which the second previously uploaded media item violated policies of the media sharing system;

determining a processing score based on the first and second policy scores; and responsive to the processing score being greater than a threshold, determining to halt the plurality of ingest processes.

20. The computer program product of claim 15, wherein the computer program code is further for responsive to determining to halt the plurality of ingest processes:

stopping the plurality of ingest processes; and transmitting a message to the client device indicating that the received media item cannot be hosted by the media sharing system.

\* \* \* \* \*